United States Patent
Fixy et al.

(10) Patent No.: US 11,795,825 B2
(45) Date of Patent: Oct. 24, 2023

(54) INTER-BLADE PLATFORM WITH A SACRIFICIAL BOX SECTION

(71) Applicant: Safran Aircraft Engines, Paris (FR)

(72) Inventors: Teddy Fixy, Moissy-Cramayel (FR); Jérémy Guivarc'h, Moissy-Cramayel (FR); Gilles Pierre-Marie Notarianni, Moissy-Cramayel (FR); Thomas Alain De Gaillard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/622,661

(22) PCT Filed: Jun. 22, 2020

(86) PCT No.: PCT/FR2020/051077
§ 371 (c)(1),
(2) Date: Dec. 23, 2021

(87) PCT Pub. No.: WO2020/260810
PCT Pub. Date: Dec. 30, 2020

(65) Prior Publication Data
US 2022/0228490 A1 Jul. 21, 2022

(30) Foreign Application Priority Data
Jun. 26, 2019 (FR) ...................................... 1906971

(51) Int. Cl.
*F01D 5/14* (2006.01)

(52) U.S. Cl.
CPC .......... *F01D 5/147* (2013.01); *F05D 2220/32* (2013.01); *F05D 2240/30* (2013.01)

(58) Field of Classification Search
CPC .... F01D 5/147; F01D 11/008; F05D 2220/32; F05D 2240/30; F05D 2220/36; F05D 2300/603; B29L 2031/7504; B29C 70/24; Y02T 50/60; F04D 29/26; F04D 29/023; F04D 29/161
See application file for complete search history.

(56) References Cited

U.S. PATENT DOCUMENTS

| 4,101,245 A * | 7/1978 | Hess ..................... F01D 11/006 416/193 A |
| 5,193,982 A * | 3/1993 | Inizan ................... F01D 11/008 416/193 A |
| 7,153,099 B2 | 12/2006 | Queriault et al. |
| 10,293,530 B2 * | 5/2019 | Marchal ................. B29B 11/04 |

(Continued)

FOREIGN PATENT DOCUMENTS

| EP | 1 503 044 A1 | 2/2005 |
| FR | 2 858 351 A1 | 2/2005 |

(Continued)

*Primary Examiner* — Aaron R Eastman
(74) *Attorney, Agent, or Firm* — BIRCH, STEWART, KOLASCH & BIRCH, LLP

(57) ABSTRACT

The invention relates to an inter-blade platform of a turbomachine fan, comprising: —a base comprising a first surface configured to delimit a flow path in the fan and a second surface on the opposite side from the first surface, —two flanks extending radially next to the second surface, each of the flanks having a sacrificial free end configured to bear against a fan disc.

20 Claims, 5 Drawing Sheets

(56) References Cited

U.S. PATENT DOCUMENTS

| | | | | |
|---|---|---|---|---|
| 2005/0276691 | A1* | 12/2005 | Queriault | F01D 21/045 |
| | | | | 415/191 |
| 2013/0052012 | A1* | 2/2013 | Kray | F04D 29/321 |
| | | | | 416/2 |
| 2014/0086751 | A1* | 3/2014 | Bottome | F01D 11/008 |
| | | | | 416/193 R |
| 2015/0016960 | A1* | 1/2015 | Ravier | F04D 29/16 |
| | | | | 415/111 |
| 2016/0160663 | A1* | 6/2016 | Mortier | B29C 49/071 |
| | | | | 264/103 |
| 2019/0390559 | A1* | 12/2019 | Guivarc'h | F01D 11/008 |

FOREIGN PATENT DOCUMENTS

| | | |
|---|---|---|
| FR | 2 989 977 A1 | 11/2013 |
| FR | 3 018 473 A1 | 9/2015 |
| FR | 3 029 563 A1 | 6/2016 |
| FR | 3 033 180 A1 | 9/2018 |
| WO | WO 2006/136755 A2 | 12/2006 |
| WO | WO 2013/088040 A2 | 6/2013 |

* cited by examiner

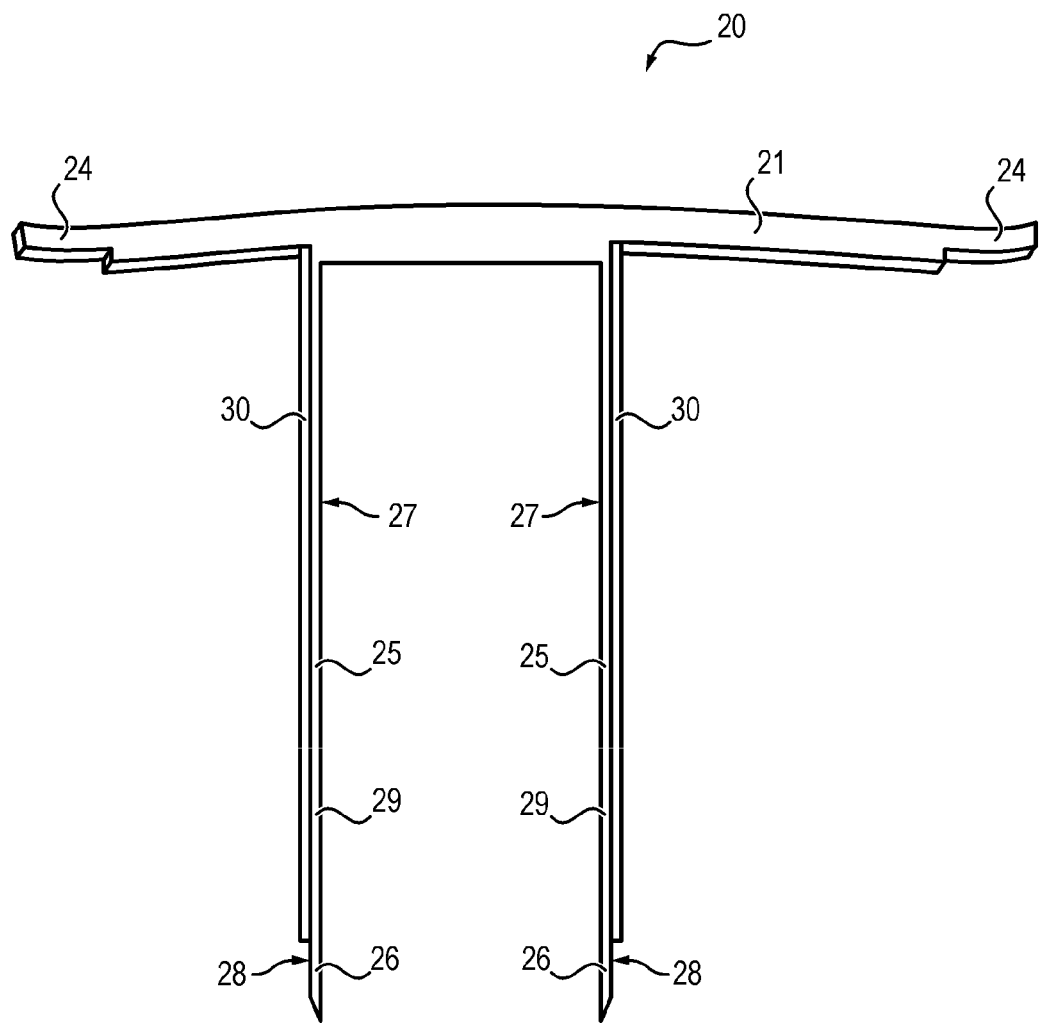

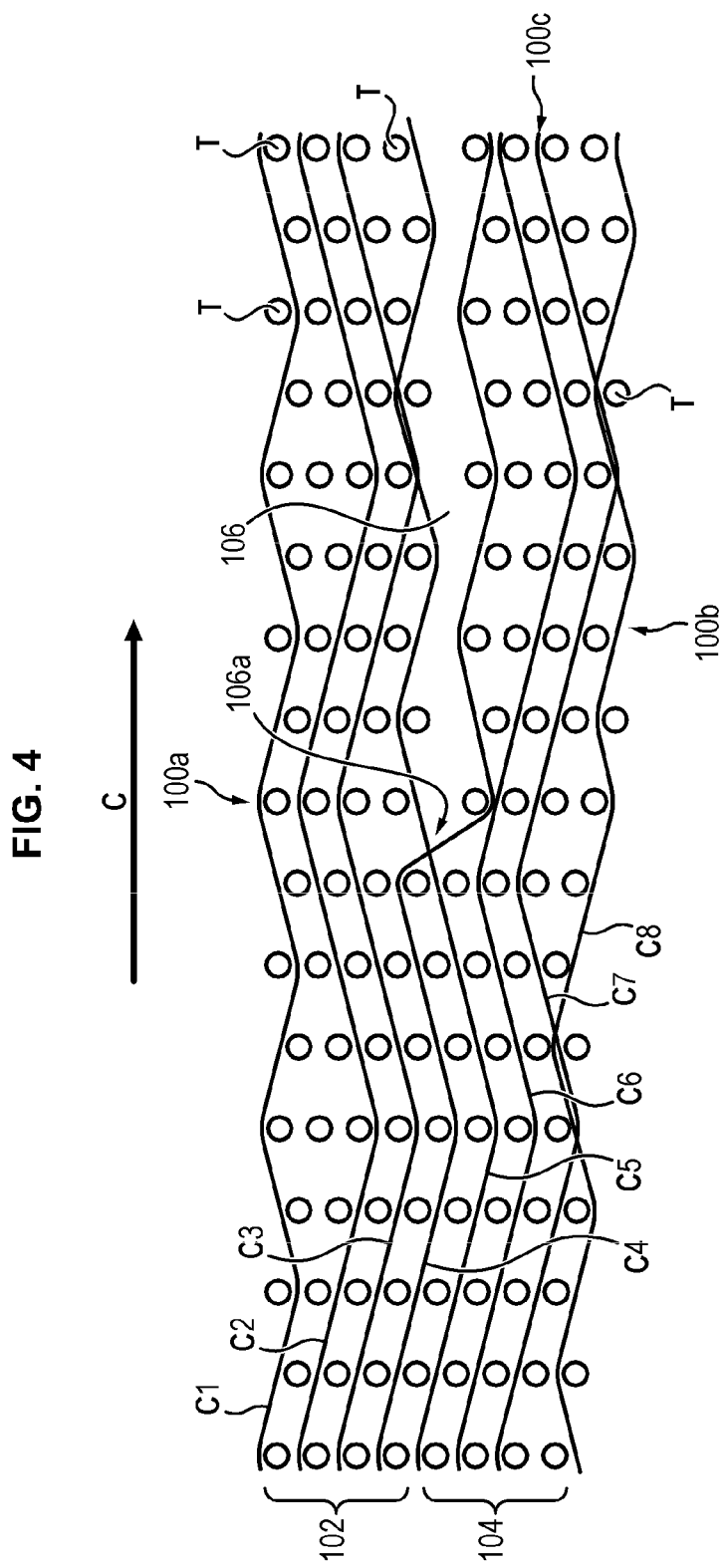

INTER-BLADE PLATFORM WITH A SACRIFICIAL BOX SECTION

FIELD OF THE INVENTION

The invention relates to the general field of inter-blade platforms in fans of aeronautical turbines, particularly when these platforms are made of a composite material comprising a fibrous reinforcement densified by a matrix.

TECHNOLOGICAL BACKGROUND

Inter-blade platforms of turbomachine, particularly turbojet, fans are arranged between the fan blades in an extension of its inlet cone. They allow in particular delimiting, on the inside, the annular air intake path in the fan, this path being delimited, on the outside, by a casing. These platforms generally comprise a base, configured to delimit the path, and a box section extending radially inward from the base in order to allows support of the platform on the fan disk. The box section is further configured to stiffen the platform in order to ensure continuity of the aerodynamic flow in the fan.

It is known to create inter-blade platforms of fans of composite material. The composite material generally comprises a fibrous reinforcement densified by a matrix. Depending on the application contemplated, the preform can be of glass, carbon or ceramic fibers and the matrix can be of an organic material (polymer), of carbon or of ceramic. For parts with a relatively complex geometric shape, it is also known to create a fibrous structure or blank in a single piece by 3D or multilayer weaving and to form the fibrous structure to obtain a fibrous preform having a shape near that of the part to be manufactured. The creation by 3D weaving of a fibrous preform with a π-(Pi) shaped cross section for the platform has thus already been proposed in document WO 2013/088040. These platforms have a π-shaped cross section with a base and two flanks forming stiffeners which extend from one face of the base and serve to stiffen the platform so as to avoid any displacement of it under the centrifugal load due to the speed of rotation of the fan.

In order to reinforce the resistance of the platform to centrifugal loads, it has been proposed to add a wall between the free ends of the flanks to form a closed box section under the base of the platform. Document no. FR 2 989 977, in the name of the Applicant, may in particular be referred to, which describes an example of a fibrous blank woven in a single piece by three-dimensional weaving for creating a platform with a closed box section. A blank of this type does indeed allow obtaining a platform of composite material and a closed box section limiting the risk of rejection. The box section thus allows providing stiffness to the platform in the face of the various mechanical stresses encountered (centrifugal force in particular and various ingestions) and the retention in position of the platform upon stopping the turbomachine.

However, the numerous operations necessary for the manufacture of a platform of this type (in particular the manufacture of the preform, the debonding, the injection and the pocketing) remain considerable and complex and are not necessarily justified for all types of engines, particularly when the fan does not undergo too great a centrifugal force during operation. In addition, in the event of impact with an object, the box section of such platforms has a tendency to allow propagation of the shock to adjacent blades, which risks penalizing the fan severely.

Document FR 3 029 563 describes an inter-blade platform comprising a base, two flanks extending radially from the base and a U-shaped structure forming a box section which extends over a portion of the length of the base. The portion of the platform which is bereft of a box section does not come into contact with the disk.

Documents FR 3 018 473 and EP 1 503 044 describe an inter-blade platform comprising a base and two flanks.

Document FR 3 033 180 describes an inter-blade platform comprising a closed box section.

SUMMARY OF THE INVENTION

One objective of the invention is therefore to optimize the costs linked to the manufacture of fan inter-blade platforms for turbomachines, particularly when they are made of a composite material such as a fibrous reinforcement densified by a polymer matrix, as well as their mass.

To this end, the invention proposes an inter-blade platform of a turbomachine fan comprising:
  a base comprising a first surface configured to delimit a flow path in the fan and a second surface opposite to the first surface and
  two flanks, extending radially next to the second surface, each of the flanks having a sacrificial free end configured to bear against a fan disk.

What is meant here by sacrificial is that the free end of the flanks wears before the rest of the flanks and before damaging the radial face (or if applicable a protective strip applied to the fan disk), so as to limit the propagation of shocks to the blades.

Certain preferred but non-limiting features of the platform described above are the following, taken individually or in combination:
  the free end of the flanks has a thickness that is smaller than an average thickness of the rest of the flanks;
  the base and the two flanks are made of a composite material comprising a fibrous reinforcement densified by a polymer matrix;
  a thickness of the fibrous reinforcement at the free end of the flanks is smaller than an average thickness of the fibrous reinforcement in the rest of the flanks;
  the thickness of the sacrificial free end of the flanks is at most equal to 75% of the average thickness of the rest of the flanks, preferably at most equal to 50% of the average thickness of the rest of the flanks;
  the free end of the flanks is machined;
  the base and the flanks are formed integrally and in a single piece;
  each flank comprises a wall formed integrally and in a single piece with the base and a plate, applied and attached to the wall, and in which either the plate extends from the base without covering the sacrificial free end, or the plate extending from the base and beyond the free end of the wall; and/or
  the base comprises a first edge and a second edge, said edges extending on either side of the flanks, the first edge and the second edge being sacrificial.

According to a second aspect, the invention also proposes a fan comprising a fan disk, at least one blade and at least one inter-blade platform as described above. A fan with a plurality of blades will be described as an exemplary embodiment.

BRIEF DESCRIPTION OF THE DRAWINGS

Other features, aims and advantages of the present invention will appear more clearly upon reading the detailed description which follows, and with reference to the appended drawings given by way of non-limiting examples and in which:

FIG. 2b is a transverse section view of an exemplary embodiment of an inter-blade platform conforming to a second embodiment of the invention.

FIG. 4 is a schematic view of an example of a fibrous three-dimensionally woven blank according to one embodiment of the invention.

DETAILED DESCRIPTION OF ONE EMBODIMENT

Figure 1:
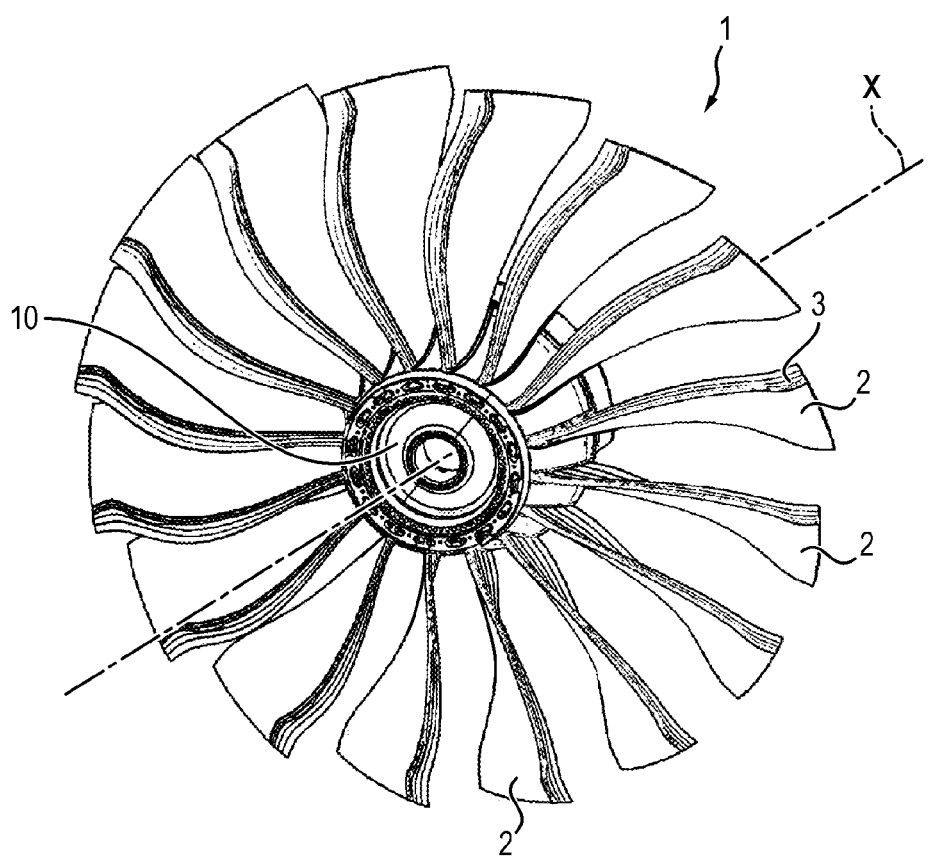
FIG. 1 illustrates an exemplary embodiment of a fan conforming to one embodiment of the invention.

In the present application, upstream and downstream are defined relative to the normal direction of flow of the gas in the fan 1 through the turbomachine. Moreover, what is called the axis of revolution of the fan 1 of the turbomachine, the radial axis X of symmetry of the fan 1. The axial direction corresponds to the direction of the axis X of the fan 1, and a radial direction is a direction perpendicular to this axis and passing through it. Absent a contrary declaration, inner and outer will be used, respectively, with reference to a radial direction so that the inner portion or face (i.e. radially inner) of an element is closer to the axis X than the outer portion or face (i.e. radially outer) of the same element.

A turbomachine fan 1 comprises a fan 1 disk 10 bearing a plurality of fan blades 2, associated with inter-blade platforms 20.

The blades 2 are engaged in axial grooves 12 formed in a radial face 14 of the fan 1 disk 10. Optionally the fan disk 10 can comprise a sacrificial protective strip 16, or foil. In a manner known per se, the protective strip 16 has as its function, during use, to protect the radial face 14 of the disk 10 by deteriorating before the disk 10.

Each blade 2 has a root, engaged in one of the grooves, a head (or tip), a leading edge 3 and a trailing edge. The leading edge 3 is configured to extend facing the flow of gas entering into the turbomachine. It corresponds to the anterior portion of an aerodynamic profile which faces the flow of air, and which divides the flow of air into a pressure side flow and into a suction side flow. The trailing edge, for its part, corresponds to the posterior portion of the aerodynamic profile, where the pressure side and suction side flows are rejoined.

The blades 2 are associated at their radially inner end with inter-blade platforms 20, which are arranged in the extension of an inlet cone.

Each platform 20 comprises:
  a base 21 comprising a first surface 22 configured to delimit a flow path in the fan 1 and a second surface 23 opposite to the first surface 22,
  two flanks 25, extending radially next to the second surface 23, each of the flanks 25 having a free end 26 configured to be supported against a fan 1 disk 10. The free end 26 of the flanks 25 extends radially to the inside relative to the base 21 and is configured to bear against the radial face 14 of the disk 10, or if applicable against the outer face of the protective strip 16.

The free end 26 of each flank 25 is sacrificial. What is meant here by sacrificial is that the free end 26 of the flanks 25 wears before the rest of the flanks and before damaging the radial face 14, or if applicable the protective strip 16, so as to limit the propagation of shocks to the blades 2.

The inter-blade platform 20 is therefore simple to produce, but also lighter, being bereft of a wall linking the radially inner end of the flanks 25, while limiting the risk of propagation of shocks to the blades 2 adjacent to the platform 20 in the event of impact. In fact, in the event of an impact, the sacrificial portion of the flanks 25 tends to be damaged, thus reducing the stiffness of the platform 20 and consequently avoiding damage to the adjacent blades 2, in particular to their root.

In one embodiment, a thickness $e_1$ of each sacrificial free end 26 is less than an average thickness $e_2$ of the rest of the flanks 25. What is meant here by thickness $e_1$, $e_2$, is the dimension along an axis normal to the flanks 25.

For example, the thickness $e_1$ of the sacrificial free end 26 of the flanks 25 is equal at most to 75% of the average thickness $e_2$ of the rest of the flanks 25, preferably equal at most to 50% of the thickness $e_2$ of the rest of the flanks 25.

For each sacrificial free end 26, a height h of the sacrificial free end 26 can be comprised between three times and six times an average thickness $e_2$ of the rest of the flanks 25. What is meant here by height h is a dimension along an axis substantially normal to the second surface 23 of the base 21.

Thus, in one exemplary embodiment, each platform 20 has flanks 25 of which the average thickness $e_2$ (aside from the free end 26) is equal to 4 mm. The thickness $e_1$ of the free end 26 can then be comprised between 2 mm and 3 mm while its height h can be comprised between 12 mm and 24 mm.

The base 21 and the flanks 25 of each platform 20 are formed integrally and in a single piece.

In one embodiment, the base 21 and the flanks 25 can be made of a composite material comprising a fibrous reinforcement densified by a polymer matrix.

The fibrous reinforcement can be formed starting with a fibrous preform obtained by three-dimensional weaving with evolving thickness. It can in particular comprise carbon, glass, aramid and/or ceramic fibers. The matrix, for its part, is typically a polymer matrix, for example epoxy, bismaleimide or polyimide. The blade 1 is then formed by molding by means of a vacuum resin injection method of the RTM (for "Resin Transfer Molding"), or even VARRTM (for Vacuum Resin Transfer Molding).

As a variant, the base 21 and the flanks 25 can be made of metal.

In a first embodiment, each sacrificial free end 26 is obtained by local thinning of the flanks 25. For each flank 25, the thinning can be accomplished on each face 27, 28 of the flank 25. As a variant, the thinning can be accomplished on the facing faces 27 of the flanks 25. According to yet another variant, the thinning can be accomplished on the opposite faces 28 of the flanks 26.

For example, when the platform 20 is made of metal or of composite material, particularly including a fibrous reinforcement densified by a polymer matrix, the sacrificial free end 26 can be machined. For example, the flanks 25 of the platform 20 can be machined after molding.

As a variant, when the platform 20 is made of a composite material, the sacrificial free end 26 can be obtained by creating an open debonding in the fibrous reinforcement. FIG. 4 in particular can be referred to, which shows schematically a chain plan of a three-dimensionally woven fibrous blank 100 from which a fibrous platform 20 preform can be formed, prior to injection of resin or densification by a matrix and possible machining, in order to obtain a fan 1 platform 20 of composite material like that illustrated in FIGS. 1 to 4. What is meant by three-dimensional weaving is that the warp yarns $C_1$-$C_8$ follow winding trajectories in order to link together the weft yarns T belonging to different layers of warp thread, with the exception of debonding sites 106, it being noted that a three-dimensional weave particularly with an interlock weave pattern, can include 2D weaving on the surface. Different three-dimensional weave patterns can be used, such as interlock, multi-satin or multi-ply weave patterns, for example, as described in particular in document WO 2006/136755. In FIG. 4, the fibrous blank 100 has two opposite surfaces 100a, 100b and comprises a first portion 102 and a second portion 104. These two portions 102, 104 form respectively a first and a second portion of the thickness e of the fibrous blank 100 between its opposite surfaces 100a, 100b.

Each portion 102, 104 of the fibrous blank comprises a plurality of superimposed layers of weft yarns T, four in the example illustrated, the number of weft yarns T being able to be any desired number, at least equal to two, depending on the desired thickness e. In addition, the number of layers of weft yarns in the portions 102 and 104 can be different from one another. The weft yarns T are arranged in columns each comprising weft yarns T from the first and from the second portion 102, 104 of the fibrous blank. On one portion of the dimension of the fibrous blank 100 in the warp direction C, the first portion 102 and the second portion 104 of the fibrous blank 100 are totally separated from one another by an open debonding site. 106 which extends from an upstream limit 106a to a downstream edge 100c of the fibrous blank 100. What is meant here by an open debonding site is a zone closed at one end and open at an opposite end which does not have the warp yarns $C_1$-$C_8$, linking together the weft yarns T of layers belonging respectively to two of the layers passing through it, in the example here the second portion 104 and the second portion 104 of the fibrous blank 100.

Aside from the open debonding site 108, the layers of weft yarns T are linked together by warp yarns of a plurality of warp yarns $C_1$ to $C_8$. In the example illustrated more precisely in FIG. 5, the same first warp yarn $C_4$ links together layers of weft yarns T of the first portion 102 of the fibrous blank adjacent to the debonding 106 and the to the layers of weft yarns T of the second portion 102 of the fibrous blank beyond the debonding 106, i.e. before the upstream limit 106a. Naturally, this connection could be accomplished by several first warp yarns.

Conversely, the same second warp yarn $C_5$ links together layers of weft yarns T of the second portion 104 of the fibrous blank adjacent to the open debonding 106 and to the layers of weft yarns of the first portion 102 of the fibrous blank beyond the closed debonding site. Of course, this connection could be accomplished by several second warp yarns. Thus, the trajectory of the warp yarn $C_5$ and that of the warp yarn $C_6$ cross at the upstream limit 106a of the open debonding site 106.

The fibrous preform 10 therefore comprises, in the direction of the warp yarns C, a first portion 24 in which the first portion 102 and the second portion 104 are attached securely so as to form, after injection of the matrix, the flank of the platform 20, and a second portion 25 extending between the upstream limit 106a of the debonding 106 and the downstream edge 100c of the preform, intended to form the sacrificial free end 26. To this end it is sufficient, after weaving, to separate the two portions 102 and 104 and to cut one of them, then place the preform after cutting in a suitable mold in order to inject the matrix into it under vacuum, in conformity with the methods habitually used (for example by an RTM or VARRTM method).

In this first embodiment, the base 21 and the flanks 25 can be formed integrally and in a single piece (monolithically). In the case where the inter-blade platform 20 is made of composite material, the flanks 25 can then be obtained by creating an open debonding site at the two opposite edges of the fibrous reinforcement, before injection of the matrix under vacuum.

In a second embodiment, each of the flanks 25 can comprise a wall 29, formed integrally and in a single piece with the base 21, and a plate 30, applied and attached to the wall 29.

In a first variant embodiment, the plate 30 extends from the base 21 without covering the sacrificial free end 26. The sacrificial end 26 of the flanks 25 is therefore formed by the uncovered portion of the walls 29. The thickness of the plate 30 and of the wall 29 being constant, the thickness of the flank 25 is therefore reduced at its free end 26.

In a second variant embodiment, the plate 30 extends from the base 21 and beyond the free end 26 of the wall 29. The sacrificial free end 26 of the flanks 25 then corresponds to the portion of the plates 30 which extends beyond the walls 29. The thickness e of the plate 30 and of the wall 29 being constant, the thickness e of the flank 25 is therefore reduced at its free end 26.

Figure 2A:
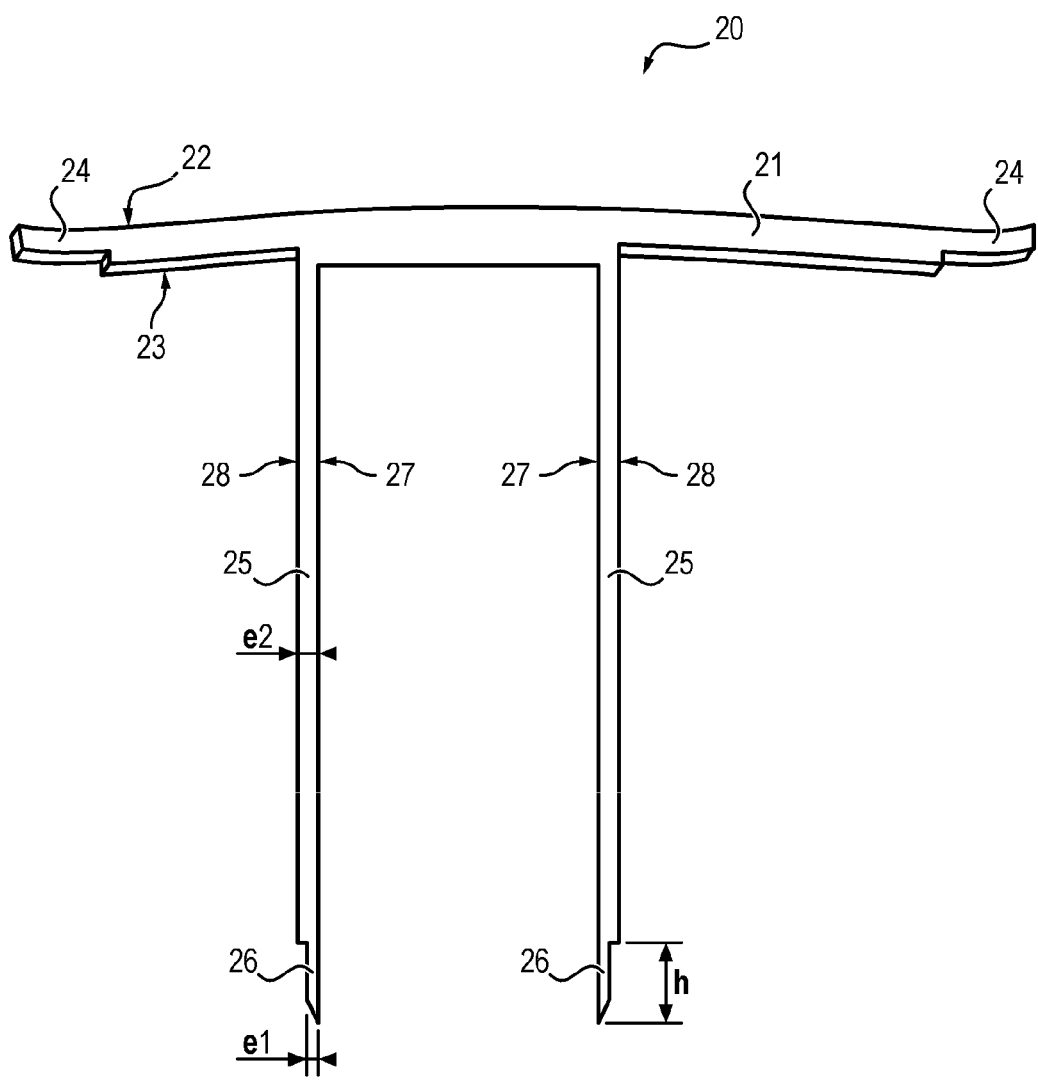
FIG. 2a is a transverse section view of an exemplary embodiment of an inter-blade platform conforming to a first embodiment of the invention.
Figure 3:
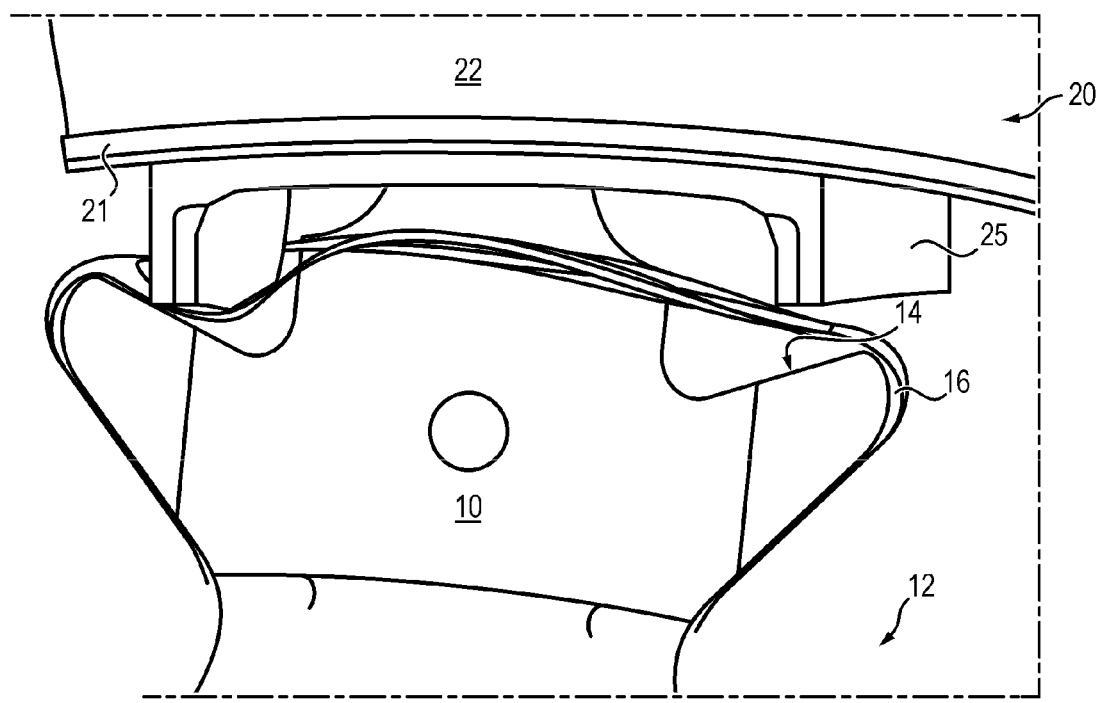
FIG. 3 is a partial perspective view of a section of a fan, seen from an upstream face of said fan.

The plates 30 can be attached to the facing faces 27 of the walls 29 of the flanks 25, so as to extend one facing the other, under the base 21, or as a variant on the opposite faces 28 of the walls 29 of the flanks 25 so as to extend on either side of said walls 29 (FIG. 2b).

The base 21 has two lateral edges 24, extending substantially parallel to the flanks 25, on either side of said flanks 25.

Optionally, in order to further reduce the risks of damaging the fan 1 blades 2 in the event of an impact, the lateral edges 24 are sacrificial. The technology of creating the sacrificial lateral edges 24 of the base 21 can be substantially identical to that of the sacrificial free ends 26 of the flanks 25, and comprise in particular machining, the creation of a debonding or the attachment of a plate 30 to the radial face of the base 21, said plate 30 then forming the first surface 22 of the base 21.

Moreover, a thickness $e_1$ of each sacrificial lateral edge 24 is less than an average thickness of the rest of the base 21. What is meant here by thickness is the dimension along an axis normal to the base.

For example, the thickness of the sacrificial lateral walls 24 is at most equal to 75% of the average thickness of the rest of the base 21, preferably equal at most to 50% of the thickness of the rest of the base 21.

For each sacrificial lateral edge 24, a length of the sacrificial lateral edge 24 can be comprised between three times and six times an average thickness of the rest of the base 21. What is meant here by length is a dimension along a circumferential axis extending between the lateral edges 24 of the base 21, which is normal to the flanks 25.

In this second embodiment, the base 21 and the walls 29 of the flanks 25 can be formed integrally and in a single piece (monolithically). In the case where the inter-blade platform is made of composite material, the walls 29 of the flanks 25 can then be obtained by accomplishing an open debonding at the two opposite edges of the fibrous reinforcement, before the injection of the matrix under vacuum.

The invention claimed is:

1. An inter-blade platform of a fan for a turbomachine comprising:

a base comprising a first surface configured to delimit a flow path in the fan and a second surface opposite to the first surface; and two flanks extending radially from the second surface of the base, wherein each flank has a free end configured to bear against a fan disk of the fan, the free end of each flank being sacrificial.

2. The inter-blade platform according to claim 1, wherein the free end of the flanks has a thickness that is smaller than an average thickness of a rest of the flanks.

3. The inter-blade platform according to claim 2, wherein the thickness of the sacrificial free end of the flanks is at most equal to 75% of the average thickness of the rest of the flanks.

4. The inter-blade platform according to claim 2, wherein the thickness of the sacrificial free end of the flanks is at most equal to 50% of the average thickness of the rest of the flanks.

5. The inter-blade platform according to claim 1, wherein the base and the two flanks are made of a composite material comprising a fibrous reinforcement embedded in a polymer matrix.

6. The inter-blade platform according to claim 5, wherein a thickness of the fibrous reinforcement at the free end of the flanks is smaller than an average thickness of the fibrous reinforcement in a rest of the flanks.

7. The inter-blade platform according to claim 1, wherein the free end of the flanks is machined.

8. The inter-blade platform according to claim 1, wherein the base and the flanks are formed integrally and in a single piece.

9. The inter-blade platform according to claim 1, wherein each flank comprises a wall formed integrally and in a single piece with the base and a plate, wherein the plate is distinct from the wall and attached to the wall and wherein the plate extends from the base without covering the sacrificial free end.

10. The inter-blade platform according to claim 1, wherein the base comprises a first edge and a second edge which extend on either side of the flanks, the first edge and the second edge being sacrificial.

11. The inter-blade platform claim 1, wherein each flank comprises a wall formed integrally and in a single piece with the base and a plate, wherein the plate is distinct from the wall and attached to the wall, and wherein the plate extends from the base and beyond the free end of the wall.

12. A fan comprising a fan disk, at least one blade and at least one inter-blade platform associated with the blade, wherein the at least one inter-blade platform comprises:

a base comprising a first surface configured to delimit a flow path in the fan and a second surface opposite to the first surface; and two flanks extending radially from the second surface of the base, wherein each flank has a free end configured to bear against the fan disk, the free end of each flank being sacrificial.

13. The fan according to claim 12, wherein the free end of the flanks has a thickness that is smaller than an average thickness of a rest of the flanks.

14. The fan according to claim 13, wherein the thickness of the sacrificial free end of the flanks is at most equal to 75% of the average thickness of the rest of the flanks.

15. The fan according to claim 12, wherein the base and the two flanks are made of a composite material comprising a fibrous reinforcement embedded in a polymer matrix.

16. The fan according to claim 15, wherein a thickness of the fibrous reinforcement at the free end of the flanks is smaller than an average thickness of the fibrous reinforcement in a rest of the flanks.

17. The fan according to claim 12, wherein each flank comprises a wall formed integrally and in a single piece with the base and a plate, wherein the plate is distinct from the wall and attached to the wall and wherein the plate extends from the base without covering the sacrificial free end.

18. The fan according to claim 12, wherein each flank comprises a wall formed integrally and in a single piece with the base and a plate, wherein the plate is distinct from the wall and attached to the wall, and wherein the plate extends from the base and beyond the free end of the wall.

19. The fan according to claim 12, wherein the base comprises a first edge and a second edge which extend on either side of the flanks, the first edge and the second edge being sacrificial.

20. A gas turbine engine comprising a fan according to claim 12 and a core engine.

* * * * *